United States Patent
Pidduck

(10) Patent No.: US 12,013,903 B2
(45) Date of Patent: Jun. 18, 2024

(54) SYSTEM AND METHOD FOR SEARCH DISCOVERY

(71) Applicant: Open Text SA ULC, Halifax (CA)

(72) Inventor: Patrick Thomas Sidney Pidduck, Waterloo (CA)

(73) Assignee: OPEN TEXT SA ULC, Waterloo (CA)

( * ) Notice: Subject to any disclaimer, the term of this patent is extended or adjusted under 35 U.S.C. 154(b) by 69 days.

(21) Appl. No.: 15/931,351

(22) Filed: May 13, 2020

(65) Prior Publication Data

US 2020/0342037 A1    Oct. 29, 2020

Related U.S. Application Data

(63) Continuation of application No. 14/086,420, filed on Nov. 21, 2013, now Pat. No. 10,678,870.

(60) Provisional application No. 61/752,744, filed on Jan. 15, 2013.

(51) Int. Cl.
*G06F 16/951* (2019.01)
*G06F 16/36* (2019.01)

(52) U.S. Cl.
CPC .......... *G06F 16/951* (2019.01); *G06F 16/374* (2019.01)

(58) Field of Classification Search
None
See application file for complete search history.

(56) References Cited

U.S. PATENT DOCUMENTS

| | | | |
|---|---|---|---|
| 8,135,580 B1 | 3/2012 | Jin et al. | |
| 8,375,042 B1 * | 2/2013 | Wang | G06F 17/30631 707/741 |
| 8,375,048 B1 * | 2/2013 | Wad | G06F 17/30672 707/708 |
| 8,392,441 B1 * | 3/2013 | Papachristou | G06F 17/3064 707/759 |
| 10,678,870 B2 | 6/2020 | Pidduck | |
| 2003/0126117 A1 | 7/2003 | Megiddo et al. | |
| 2003/0200199 A1 | 10/2003 | Snyder | |
| 2004/0199498 A1 | 10/2004 | Kapur et al. | |
| 2005/0091197 A1 * | 4/2005 | Dettinger | G06F 17/30672 |
| 2005/0137856 A1 * | 6/2005 | Cencini | G06F 17/2288 704/10 |
| 2005/0278292 A1 * | 12/2005 | Ohi | G06F 40/242 |
| 2007/0179940 A1 * | 8/2007 | Robinson | G06F 17/3064 |
| 2008/0114721 A1 * | 5/2008 | Jones | G06Q 30/0254 |
| 2008/0319962 A1 * | 12/2008 | Riezler | G06F 17/30672 |
| 2009/0106224 A1 * | 4/2009 | Roulland | G06F 17/30646 |
| 2009/0198671 A1 | 8/2009 | Zhang et al. | |
| 2009/0198672 A1 * | 8/2009 | Jones | G06F 17/30672 |
| 2009/0319510 A1 * | 12/2009 | Miller | G06F 17/30613 |

(Continued)

OTHER PUBLICATIONS

Office Action issued for U.S. Appl. No. 14/086,420, dated Jul. 22, 2016, 13 pages.

(Continued)

*Primary Examiner* — Grace Park
(74) *Attorney, Agent, or Firm* — Sprinkle IP Law Group

(57) ABSTRACT

A search system as disclosed analyzes a file name to identify any potential tokens or words that might be relevant, and creates supplementary information for the file name. The supplementary information is indexed and searchable, thereby significantly improving the ability of a search engine to discover and return successful search hits.

15 Claims, 3 Drawing Sheets

(56) References Cited

U.S. PATENT DOCUMENTS

| | | | | |
|---|---|---|---|---|
| 2010/0023514 A1* | 1/2010 | Parikh | G06F 17/2735 | 707/E17.001 |
| 2010/0169361 A1* | 7/2010 | Chen | G06F 16/285 | 707/769 |
| 2010/0205172 A1* | 8/2010 | Luk | G06F 17/30616 | 707/715 |
| 2011/0125764 A1* | 5/2011 | Carmel | G06F 17/30637 | 707/749 |
| 2011/0184946 A1* | 7/2011 | Hennum | G06F 16/3338 | 707/769 |
| 2011/0185015 A1* | 7/2011 | Stolper | G06Q 30/0603 | 709/203 |
| 2012/0096042 A1* | 4/2012 | Brockett | G06F 17/30448 | 707/798 |
| 2012/0117102 A1* | 5/2012 | Meyerzon | G06F 17/3064 | 707/767 |
| 2012/0130978 A1* | 5/2012 | Li | G06F 17/3064 | 707/706 |
| 2012/0226687 A1* | 9/2012 | Xu | G06F 17/30672 | 707/728 |
| 2013/0041921 A1 | 2/2013 | Cooper et al. | | |
| 2013/0185330 A1* | 7/2013 | Li | G06F 17/30864 | 707/771 |
| 2013/0238584 A1* | 9/2013 | Hendry | G06F 16/319 | 707/706 |
| 2014/0012841 A1* | 1/2014 | Will | G06F 17/30672 | 707/728 |
| 2014/0172901 A1* | 6/2014 | Shukla | G06F 17/30672 | 707/765 |
| 2014/0201188 A1* | 7/2014 | Pidduck | G06F 17/30864 | 707/711 |
| 2016/0307000 A1 | 10/2016 | Nguyen et al. | | |

OTHER PUBLICATIONS

Office Action issued for U.S. Appl. No. 14/086,420, dated Jan. 23, 2017, 17 pages.
Office Action issued for U.S. Appl. No. 14/086,420, dated Jul. 25, 2017, 23 pages.
Office Action issued for U.S. Appl. No. 14/086,420, dated Jan. 16, 2018, 22 pages.
Office Action issued for U.S. Appl. No. 14/086,420, dated Oct. 10, 2018, 16 pages.
Office Action issued for U.S. Appl. No. 14/086,420, dated Mar. 13, 2019, 14 pages.
Office Action issued for U.S. Appl. No. 14/086,420, dated Nov. 4, 2019, 15 pages.
Notice of Allowance issued for U.S. Appl. No. 14/086,420, dated Jan. 27, 2020, 15 pages.

* cited by examiner

SYSTEM AND METHOD FOR SEARCH DISCOVERY

CROSS-REFERENCE TO RELATED APPLICATION(S)

This application is a continuation of, and claims a benefit of priority under 35 U.S.C. § 120 from, U.S. patent application Ser. No. 14/086,420, filed Nov. 21, 2013, entitled "SYSTEM AND METHOD FOR SEARCH DISCOVERY," issued as U.S. Pat. No. 10,678,870, which claims a benefit of priority from U.S. Provisional Application No. 61/752,744, filed Jan. 15, 2013, entitled "SYSTEM AND METHOD FOR SEARCH DISCOVERY," both of which are hereby fully incorporated herein for all purposes.

TECHNICAL FIELD

This disclosure relates generally to search engines and, more particularly, to a hybrid full text and metadata search engine capable of indexing and searching objects across naming conventions.

BACKGROUND

A search engine is a computer program or a set of programs used to index information and search for indexed information. In a conventional search engine, a tokenizer converts an input string (such as a file name) into discrete tokens that are indexed by the search engine. A tokenizer is a software tool programmed to perform tokenization. Tokenization refers to the process of breaking up a string of text into words, phrases, symbols, or other meaningful elements called tokens. Creating such tokens is not an exact science and requires some heuristics. These tokens are then used in a search index for full text searching. A token, in this context, refers to a word or an atomic data element that cannot be parsed any further.

For example, suppose Adam names a document "my-text-doc", a tokenizer would typically convert the input string "my-text-doc" into three tokens (also referred to as data elements in this disclosure): "my", "text", and "doc". The document "my-text-doc" is then indexed by the search engine using these tokens. A search string can be tokenized in a similar way. Thus, when Bob searches for the document "my-text-doc" using a search string "my text doc", the search string is tokenized into three tokens: "my", "text", and "doc". The search engine searches its file name index using these tokens, successfully locates the document "my-text-doc", which is indexed using the same tokens, and returns the correct document.

However, this tokenizer approach cannot handle many of the possible variations that may occur in a string. For example, if Adam names the document "MYtext.doc", it is not clear whether there should be one token "mytext" or two tokens "my" and "text". If the document is tokenized one way and Bob searched in the other, the search may fail.

Further, the tokenizer approach produces only a single tokenized representation of a file name and may also take out characters that may be used for searching. Thus, if Adam names the document "MY-text-doc", and the tokenizer outputs three tokens: "my", "text", and "doc" for indexing, then a search for "my-text" or "-text" may fail as neither search string will result in the same tokens: "my", "text", and "doc" for searching.

Given the deficiencies in conventional search engines, there is room for innovations and improvements.

SUMMARY OF THE DISCLOSURE

Embodiments disclosed herein can analyze a text string such as a file name to identify any potential tokens or words that might be relevant, and create supplementary information that makes these words available for search indexing. The extra words in the supplementary information in turn can improve the ability of a search engine to discover an intended target, for instance, an arbitrarily named document. The search engine may reside in a search system communicatively connected to various devices on a network.

The supplementary information may be represented in several possible ways, including a new metadata field with special properties, or as additional values if the search engine can handle multi-value fields. In some embodiments, the additional or supplementary information may include permutations or representations of a data item in an input file name. This way, multiple values of data items in the input file name can be created and used for searching.

In some embodiments, the search system may, in response to an indexing request, process an input string in the indexing request into tokens, determine additional index terms that can supplement the tokens, and index the tokens and the additional index terms that supplement the tokens. In this disclosure, such additional index terms may also be referred to as "supplementals." During a search operation, the indexed data items and the indexed supplementals are searched against each input data item in a search query. Optionally, the search query may also be processed into tokens and augmented with supplementals. A search query to the search engine may, in one embodiment, be constructed by an application such as a document management system or a software module thereof.

Suppose the search query contains one or more input data items representing a particular file name, the search engine may use the indexed data items, their indexed supplementary information, or a combination thereof that matched the one or more input data items to search the particular file name across naming conventions and return an object corresponding to the particular file name in response to the search query. In this way, the search system can handle many of the possible variations that may occur in a string and provide results that are not possible for conventional search engines to achieve.

In some embodiments, a system having a processor and a non-transitory computer-readable storage medium such as a memory can be configured to implement the search system. In some embodiments, a computer program product may include one or more non-transitory computer-readable storage media storing computer instructions that are executable or translatable by at least one processor to implement the search system.

Numerous other embodiments are also possible.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Before describing embodiments in detail, it may be helpful to discuss an example search system.

Figure 1:
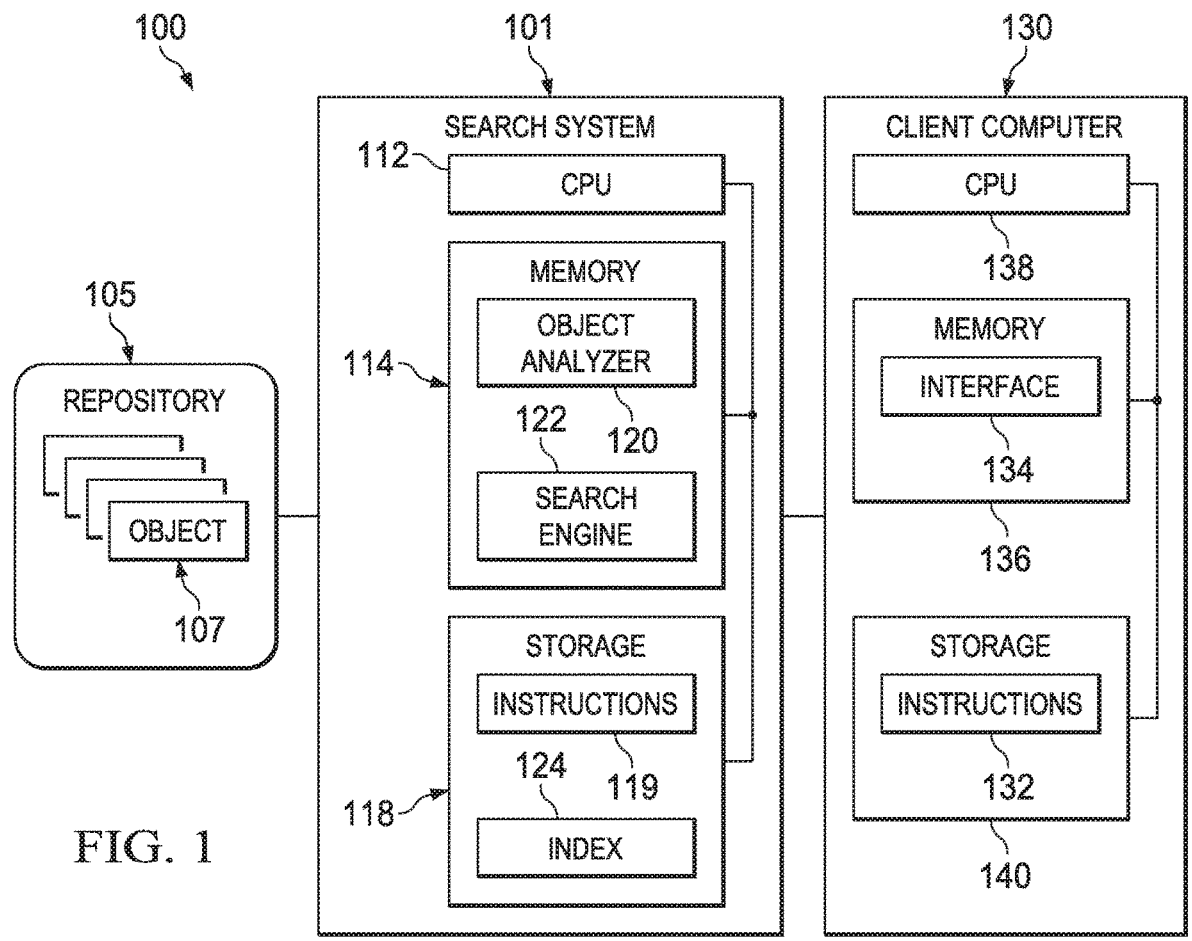
FIG. 1 depicts one embodiment of a computing environment in which one embodiment of a search system can be implemented.

FIG. 1 depicts a block diagram illustrating an example of computing environment 100 having object repository 105, search system 101, and client computer 130. Object repository 105 may comprise a file server or database system or other storage mechanism remotely or locally accessible by search system 101. Object repository 105 may store objects 107 (e.g., documents, images, emails or other objects) that may be searchable by search system 101.

In the embodiment of FIG. 1, search system 101 comprises a server having central processing unit 112 connected to memory 114 and storage unit 118 via a bus. Central processing unit 112 may represent a single processor, multiple processors, a processor(s) with multiple processing cores and the like. Storage unit 118 may include a non-transitory storage medium such as hard disk drives, flash memory devices, optical media and the like. Search system 101 may be connected to a data communications network.

Storage unit 118 stores computer executable instructions 119 and index 124. Computer executable instructions 119 can represent multiple programs and operating system code. In one embodiment, instructions 119 are executable to provide object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indexes or other arrangements of information. While shown as a single index, index 124 may include multiple indexes.

Client computer system 130 may include components similar to those of the server of search system 101, such as CPU 138, memory 136, and storage 140. Additionally, client computer system 130 may include executable instructions 132 to provide user interface 134 that allows a user to enter a search query. User interface 134 may be provided through a web browser, file system interface or other program.

Those skilled in the art will appreciate that search system 101 shown in FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 may analyze objects in object repository 105 to determine information to be indexed in index 124. When an object 107 is added to search system 101, two types of information are generally indexed, one or both full text and metadata. As an example, suppose object 107 being added to search system 101 is a text file, the text or content of the file is indexed as well as information about the file. In some cases, the metadata itself may include important information associated with the object 107. This metadata may need its own descriptive metadata indicating attributes of the metadata. In some cases, the metadata on its own without full text content is sufficient to represent an object. Object analyzer 120 can send indexing instructions to search engine 122 to direct search engine 122 to add, modify, or delete metadata or text in index 124.

Object analyzer 120 may be a portion of a larger program, such as a document management program, may be a separate program or may be implemented according any suitable programming architecture. In one embodiment, the process of determining metadata and text to be indexed may be carried out by any number of different programs on a computer system or distributed across computer systems. Detailed discussions concerning an example of an object analyzer can be found in U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

When a search query is received at search system 101, search engine 122 can search the information in index 124 to identify objects (content) 107 responsive to the search query and return a list or other representation of those objects 107 to client computer 130. An example search engine will now be described with reference to FIG. 2.

Figure 2:
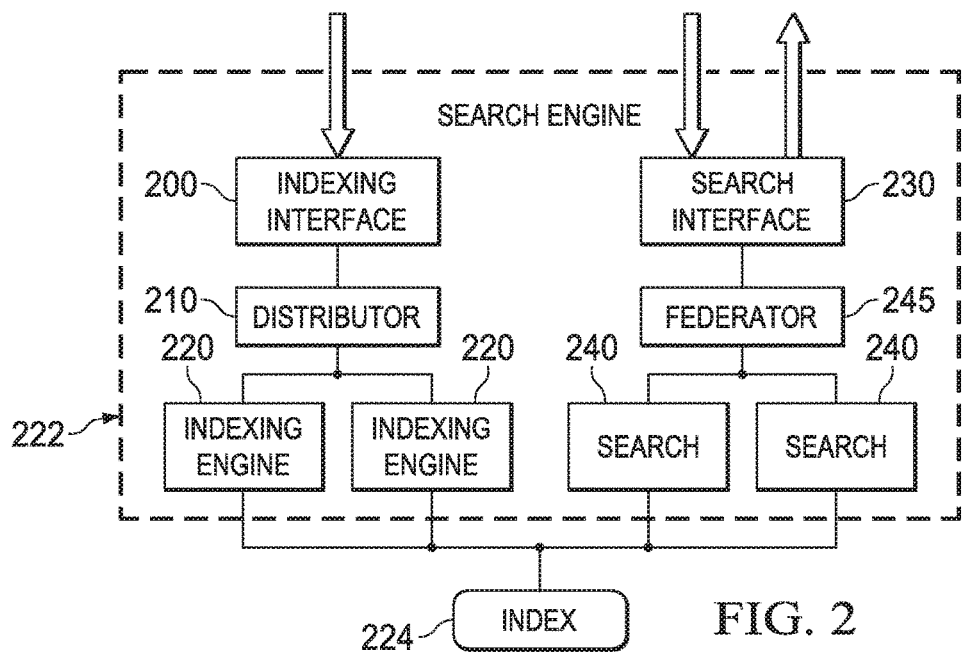
FIG. 2 depicts a functional block diagram illustrating one embodiment of a search engine.

FIG. 2 depicts a diagrammatic representation of logical blocks for one embodiment of search engine 222. Search engine 222 may provide indexing interface 200 that receives indexing requests (e.g., from object analyzer 120) or other source. A distributor module distributor 210 may distribute the indexing requests to indexing engines 220 that act on the indexing requests to update index 224. Search engine 222 may also include search interface 230 to receive queries (e.g., from a user, a content server or other source). Search interface 230 may send queries to search modules 240. Federator 245 may gather the results from all search modules 240 together, and generate a response to the query received through search interface 230. Search modules 240 are responsible for performing searches on an index partition, computing relevance score, sorting results, and retrieving metadata regions to return.

In the above example, a user has constructed the search queries. It should be noted, however, that the user could be any system that issues queries to the search system, and may include other computer programs searching on behalf of other users, creating reports or running automatic processes. Since there can be many different types of metadata and/or attributes in the search index, the search queries are not restricted to "text" based search terms.

FIG. 2 is provided by way of example. Search engine 222 may include any number of other modules or configurations to update and search index 224. For example, search modules 240 and indexing engines 220 may be a single module. Search engine 222 may be a portion of a larger program, such as a document management program, may be a separate program or may be implemented according to any suitable programming architecture. Furthermore, the processes of search engine 222 may be distributed across multiple computer systems. Additionally, while in FIG. 2, index 224 is illustrated as a single index, index 224 may comprise a set of smaller indexes. For example, a separate index can be used by each indexing engine.

A successful word search in a search engine requires that the search terms match the content being searched, subject to the variations supported by the search engine. While this seems to be a straightforward requirement, there is no guarantee that every word search in a search engine will be successful, particularly when it comes to searching technical object names commonly used in computer systems, or used as part numbers. Example technical object names include, but are not limited to, file names, Internet resources, server addresses, directory structures, part numbers, etc. Non-limiting example Internet resources may include HTTP (Hypertext Transfer Protocol) URLs (Uniform Resource Locators), etc. Non-limiting example directory structures may include FTP (File Transfer Protocol) directory structures, etc.

One reason why searching technical object names commonly used in computer systems can be a very difficult task is that there are no standard naming conventions for these objects, which makes it difficult to match the underlying words. For example, suppose that a person named Adam creates a document, and the key words Adam uses to name the document file are "my", "text", and "doc". There is no standard or uniform way for how files should be named. Thus, in this example, depending upon the choices that Adam makes, the document may be saved on disk with many possible name variations such as:

My text doc
My text.doc
My:text-doc
MyText.doc
My_text\doc
MYtext doc
MY+text~doc Adding to the difficulty is that there are often situations where characters in a name may be encoded because of rules or limitations that are imposed during communication and/or to comply with encoding limitations. For example, when the same document that Adam has created is uploaded from his computer to a server computer or downloaded from a server to a local machine, certain characters may be added to the file name to comply with encoding limitations imposed by the machine at the receiving end. So, in this example, other variations may be introduced without Adam's knowledge, resulting in additional possible forms such as:

My % 20text % 20doc
My % 2Dtext.doc
My text&doc

In the examples above, the use of URL encoded characters such as % 20 or % 2D, are common when names are used in URLs. Presentation of HTML encoded characters such as   or & may occur when document names are represented on HTML pages. This can occur without Adam's knowledge if the document is committed to a web-based document management system, for example.

When another user Bob attempts to find this document, he is likely to face difficulties if he does not know the exact name of the document. Even if Bob knows the key terms "my", "text", and "doc", Bob is not likely to correctly guess how they should be joined together, and hence Bob's search for the document may fail. For example, a search by Bob for "my text doc" will not find the document if the file name for the document is actually "MYtext % 2Ddoc".

A prior approach to solving this problem is through the application of a tokenizer on the file name while the file name is indexed by a search engine. However, as explained above, conventional tokenizers have several deficiencies.

Figure 3:
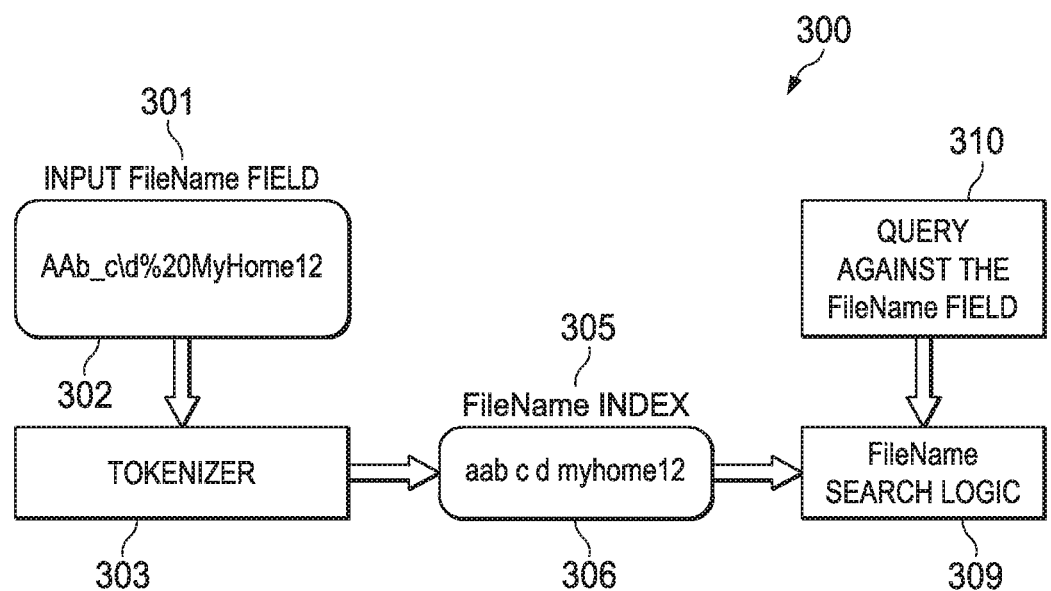
FIG. 3 depicts a prior art search system with a conventional tokenizer.

Further drawbacks of the tokenizer approach will now be described with reference to a prior art search engine as illustrated in FIG. 3. In the example of FIG. 3, search engine 300 comprises a conventional Tokenizer 303. When an object is provided to search engine 300 for indexing, a name value (e.g., name value 302 shown in FIG. 3) is also provided in an input field (e.g., "FileName" 301 shown in FIG. 3). Non-limiting examples of an object can include a document, a file, a resource, a file system object, a part number, etc. In an enterprise computing environment, this object may be managed by a document management system. The input field 301 may have a data type that is typically used for names and descriptions of objects that are encoded or structured for use with digital information. For illustration purposes, in this example, the input field FileName 301 may have a name value "AAb_c\d % 20MyHome12", as indicated by a reference number 302.

Name value 302 for the input object is prepared for indexing using Tokenizer 303. Tokenizer 303 can break name value 302 into tokens or words based on established string parsing rules. For example, Tokenizer 303 may break "AAb_c\d % 20MyHome12" into a single tokenized representation that includes four tokens: "aab", "c", "d", and "myhome12".

The output from Tokenizer 303 is then processed by search engine 300 to create search index entries 306 for the input object based on these tokens. The indexed information (search index entries 306) are stored by search engine 300 in an index (e.g., FileName Index 305 shown in FIG. 3).

At a later time, a search query (e.g., query 310 shown in FIG. 3) may be constructed to search for the object using a particular file name via a FileName Field provided by search engine 300. A search logic (e.g., FileName Search Logic 309 shown in FIG. 3) may search the index (e.g., FileName Index 305 shown in FIG. 3) for entries that match the search query and return search results accordingly. If search query 310 does not contain the exact terms or words that had been previously tokenized, indexed, and stored in FileName Index 305, search engine 300 will fail to return the object. Should the object be managed by a document management system, this failure can be a serious issue.

Another issue commonly encountered by document management systems with embedded search engines relates to specialized naming conventions. Consider a parts manufacturing company that makes components with part numbers along these lines: H27b-RED\V1 and B36x-BLUE\V2. Conventional tokenizers may not be able to parse such part numbers due to their special naming conventions. A prior approach is to provide a custom tokenizer for the part number field. Such a custom tokenizer can be optimized for the expected form of the part number.

One limitation with this approach is that a specific field that is optimized for part numbers is required. Furthermore, the custom tokenizer is restricted to the expected form of the part number. With such a custom tokenizer, it is not practical to place values structured like part numbers in a general purpose name field. Moreover, creating a custom tokenizer represents a burden on the user, and is often impractical.

Prior Tokenizer approaches—conventional or customized, therefore, have their limitations. Embodiments disclosed herein can significantly improve the ability of a search engine to locate and return correct results, even if objects provided to the search engine do not follow the same, expected, and/or known naming conventions.

As will be discussed in greater detail below, embodiments disclosed herein relate to how specific types of metadata can be processed in a search engine. The most common application is for metadata that represents names of objects represented in digital form. Example metadata may include, but are not limited to, file names, the URLs used for web pages, part numbers, etc. Additional scenarios exist. For example, a name given to an object in a document management system can be a type of metadata for the object. For the sake of brevity, any object type that has these properties are referred to herein as a "FileName" field in the description.

In accordance with this disclosure, providing alternative sets of data in addition to values in the "FileName" field can significantly improve the ability to locate objects based on their names, especially when those names or labels use naming conventions employed on computer systems. Since computer systems may operate on different platforms, access different types of network file systems, utilize various network protocols, etc., they may not employ and/or support the same naming conventions.

Search engines must often be able to return the values within a metadata field, in addition to searching on the metadata field. Embodiments provide a search engine that utilizes a novel approach that includes a metadata field for supplementary information. This metadata field is referred to as "Supplement" and is distinct from a File Name field. This feature will now be further described with reference to FIG. 4.

Figure 4:
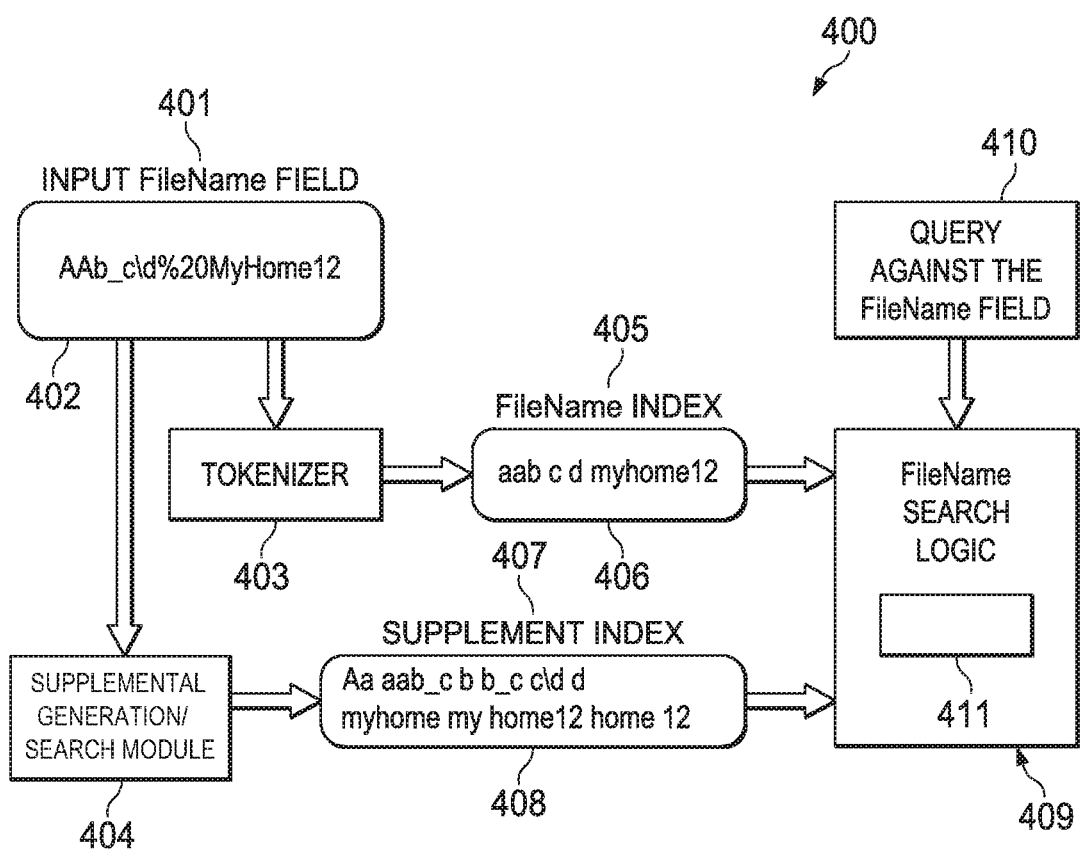
FIG. 4 depicts a diagrammatical representation of an example embodiment of a search system having a tokenizer component and a supplemental generation/search component, the search system providing an intelligent and flexible search across naming conventions.

FIG. 4 depicts a diagrammatical representation of an example embodiment of a search system having a tokenizer component and a supplemental generation/search component and providing a more intelligent and flexible search indexing. In FIG. 4, only a small subset of a search engine 400 is shown. Search engine 400 may be an embodiment of search engine 100 or search engine 200 described above. Those skilled in the art will appreciate that search engine 400 may include many other logical components and features. Only those which are necessary for describing the embodiments are shown in FIG. 4. Further, the teachings of this disclosure may be used in conjunction with other search engine features such as stemming, phonetic or thesaurus expansion of terms, and is not intended to restrict the use of other search features.

Figure 5:
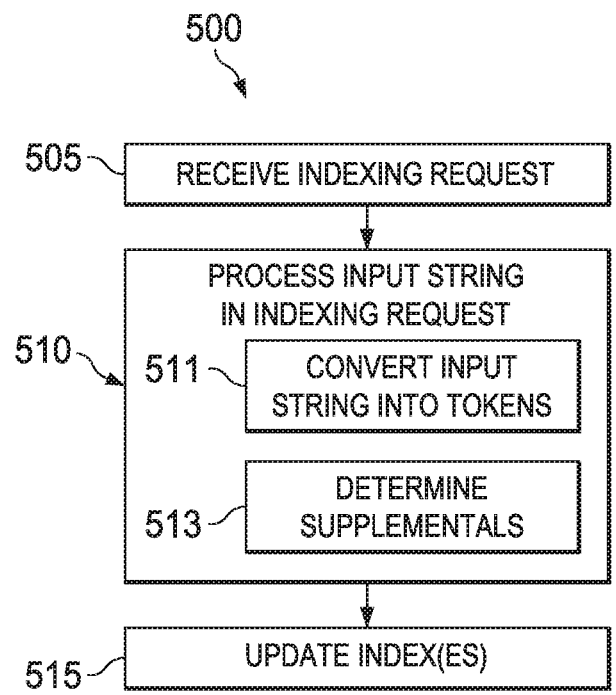
FIG. 5 is a flow diagram illustrating an example of one embodiment of a method of processing an indexing request received by a search system.
Figure 6:
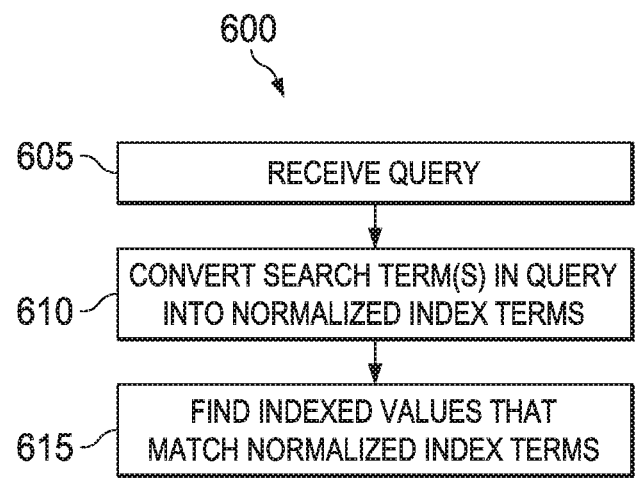
FIG. 6 is a flow diagram illustrating an example of one embodiment of a method of processing a search query received by a search system.

Aspects and features of search engine 400 may be explained in conjunction with FIGS. 5 and 6 where FIG. 5 is a flow diagram illustrating an example of one embodiment of method 500 of processing an indexing request and FIG. 6 is a flow diagram illustrating an example of one embodiment of method 600 of processing a search query.

When an object is provided to search engine 400 for indexing (e.g., at step 505 of FIG. 5), a name value may be provided in an input field (e.g., "FileName" 401 shown in FIG. 4). This FileName data type is typically used for names and descriptions of objects that are encoded or structured for use with digital information. Examples include file names, web page names (or URLs) and names of objects in document management systems.

For illustration purposes, a value of the input field FileName 401 might be "AAb_c\d % 20MyHome12", as indicated by a reference number 402.

FileName value 402 may be prepared (e.g., at step 510 of FIG. 5) by search engine 400 for indexing using two types of indexing methods built-in to search engine 400. In the example of FIG. 4, the different indexing methods are implemented by Tokenizer 403 and Supplemental Generation/Search Module 404. First, Tokenizer 403 may be employed to break FileName value 402 into a sequential subset of the input File Name (e.g., at step 511 of FIG. 5) based on string parsing rules. In this example, the sequential subset of the input File Name "AAb_c\d % 20 MyHome12" has four tokens: "aab", "c", "d", "myhome12". Example parsing rules are provided below.

The output from Tokenizer 403 may be processed by search engine 400 to create search index entries based on the tokens. These may be stored by search engine 400 in an index (e.g., FileName Index 405 shown in FIG. 4). In FIG. 4, the indexed information is represented by tokenizer values 406 in FileName Index 405.

In addition to the tokenizer indexing method described above, a second type of indexing method is provided by processing FileName value 402 through Supplemental Generation/Search Module 404. Supplemental Generation/Search Module 404 may use several different rules and methods for generating new index terms that supplement the output from Tokenizer 403.

As will be described further below, in some embodiments, configuration information may be used to identify certain data subset(s) in the input field of search engine 400 so that the indexing process (e.g., process 500 of FIG. 5) may invoke a supplementary process (e.g., at step 513 of FIG. 5) when appropriate (e.g., at step 510 of FIG. 5) and thus activate or implement both Tokenizer 403 (e.g., at step 511 of FIG. 5) and Supplemental Generation/Search Module 404 (e.g., at step 513 of FIG. 5).

In some embodiments, the supplementary process results in supplementary data that can include partial repetition and overlapping data subsets of the input file name. In the example illustrated, supplementary data for "AAb_c\d % 20MyHome12" may include: "Aa", "aab_c", "b", "b_c", "c\d", "d", "myhome", "myhome12", and "home 12".

In some embodiments, the supplementary data thus generated may include some overlap with Tokenizer values 406. In some embodiments, if there is such an overlap with the Tokenizer values, overlapping values may be discarded before the supplementary data are indexed and stored in a supplemental index (e.g., Supplement Index 407 shown in FIG. 4) as supplementals (e.g., Supplement values 408 shown in FIG. 4).

At a later time, a search query may be constructed to search for certain values. For example, referring to FIG. 4, search query 410 may be constructed in or applied against the FileName field of search engine 400 shown in FIG. 4. In embodiments disclosed herein, a search logic (e.g., FileName Search Logic 409 shown in FIG. 4) is operable to search not only in FileName Index 405, but also in Supplement Index 407 to find matches for search query 410. In some embodiments, searching within the Supplement Index 407 alone may be sufficient. Entries in the search index that match the terms indexed in one or both of FileName Index 405 and Supplement Index 407 are considered a search hit, and returned in search results accordingly.

In some embodiments, FileName Search Logic 409 includes one or more routines 411 for searching Tokenizer values 406 in FileName Index 405 and Supplement values 408 in Supplement Index 407. Referring to FIG. 6, such routines 411 may determine that a query has been received (step 605) and process the query in a manner similar to the indexing process described above (step 610) before performing the search (step 615). Aspects of query processing method 600, which can be optional and configurable, are described in further detail below.

Supplement Index 407 can be represented as a distinct and separate metadata field, for instance, a Supplement field, in search engine 400. In some embodiments, however, Supplement Index 407 may be represented in a search engine having multiple metadata value fields for the FileName field. In a multi-value implementation, one of the values would contain the file name information, and one of the values would contain the supplementary information. Furthermore, when implemented with multi-value fields, attributes can be used to discriminate between original file name values and those added by the supplementary process. An example search engine implementing key-value attributes for metadata fields can be found in the above-referenced U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA.".

Depending on the accuracy requirements and features of search queries that are desired, positional information for each element in a Supplement field may be encoded in a Supplement index, as well as markers for the start and end of the FileName field. In some embodiments, ordering the normalized tokens to ensure they correctly parse from left to right can satisfy precedence requirements.

Further, in some embodiments, the FileName index 405 and the Supplement index 407 described above may be implemented as a single index.

In FIG. 4, the supplementary process is shown as a step within the search engine 400. In some embodiments, the supplementary process may be implemented as a prior step when information is being prepared for ingestion by a search engine. Search engines often use data preparation steps to perform tasks such as identifying file formats, adding semantic or sentiment value, extracting text from documents or deriving metadata through analysis. The supplementary process can be included in such preparation stages. In this case, the supplementary process would create a new metadata field to be indexed, or supplement existing FileName fields with additional values.

The supplementary process can have a number of configuration settings to control how the supplementary process should occur. Different rules may be appropriate for different applications, or based on the nature of the FileName field usage.

Below is a sample list of possible rules which may be incorporated in a supplementary process and that may require configuration. These include, but are not limited to:

Camel Case—potentially splitting a string based on first letter capitalization. For example MyHome→my home.

Case Transition—potentially splitting a string based on a switch from consecutive capital to lower case characters, or vice versa. For example: LOUDvoice→loud voice; softVOICE→soft voice Variant Levels—potentially identifying the number of variants to retain. For example, with a level of 2: A_b_c_d→a a_b b b_c c c_d d With a level of 3: A_b_c_d→a a_b a_b_c b b_c b_c_d c c_d d URL Decoding—conversion of common URL encoding characters to simpler equivalents. For example: some % 2dhypen→some-hyphen. This type of decoding can be a preprocessing step in the supplementary process.

HTML Decoding—conversion of HTML encoding characters. For example: this>that@stop→this>that@stop. This type of decoding can also be a preprocessing step in the supplementary process.

White Characters—there may be a list of characters that are suggested to be white space if encountered. For example, a decimal point in a file name can be a separator: bob.fred-→bob fred Null Characters—there may be a list of characters or strings that should be treated as null characters, removed without inserting white space. For example, the html encoded character ­ is a "hint", and should be removed.

Digit Transitions—define whether transitions to digits from letters or vice versa should trigger tokenization. For example: gretzky99→gretzky 99

Dictionary Splitting—define whether words that meet prefix or joined word criteria based on grammar rules or dictionaries should be applied. For example: "prepopulate rainstorm"→pre populate rain storm.

Character Set Splitting—define whether transitions between distinctly different character sets—such as Arabic, Japanese and Western, should trigger splitting. For example: 日宅 blue→日宅 blue.

Special Character Generalization—define whether groups of punctuation or other characters should be generalized to reduce permutations. An example with part numbers: PN#zz-25.4≥pn-zz-25-4. If the search query parser performs a similar conversion, then a user searching for "PN:zz/25/4" will locate this object. This can be combined as a pre-processing step with other features of the supplementary process.

Currencies—character patterns with a probability of representing currency values can place a normalized value in the supplement. For example: 9,445,450→9445450.00

Dates—character patterns with a probability of representing a date may add the likely date values to the supplement. For example: report6/12/12.doc→report 2012 20121206 december.

Character Uncertainty—certain character patterns are easily misread, and discovery can benefit from handling variations. In printed English the letter uppercase O and the number 0 are often confused, as are the number 1, the lowercase l (ell), an upper case I or the computer symbol vertical bar |. For example: hel1O→hello.

To improve the likelihood of obtaining matches, similar rules can be applied to the search query terms in a search query before looking for matches.

For example, if the search terms are "aaB home012", then it could be converted to "aa b home 12" before matching. In essence, the same types of token conversions occur, but to a single normalized form that more likely match the supplement field values.

For example, the field values of:
AAb_c\d % 20MyHome012
might have been indexed using supplementals generated from the supplementary process as follows:
aa b aab be c d cd myhome my home 012 12

If the example same string was used in the query, the query tokenization would be:
aa b c d my home 12
and the query would match.

As described above, the tokenization processes during indexing create permutations of tokens, while the tokenization process for the query creates a "best" breakdown that is covered by the input tokenization.

The above-described examples of query preparation processes applied to search query terms can be optional and configurable.

In some embodiments, alternatives may be used in a query preparation process. For example, if there is no clear rule on whether currencies include cents, a query for:
Red 1,999.50
might be restructured internally to become a query for:
Red and (1999.50 or 1999)

In this way, uncertainty can be handled during indexing by creating multiple tokens representing alternatives. Additionally, uncertainty can also be handled during a query by creating alternative search queries.

The configuration of features described above may occur in many possible ways and may, for example, include a combination of default values, naming conventions, configuration files, programmatic configuration, or stored values in a system such as a database.

It is possible for multiple FileName metadata fields to exist within a single search index, each with related Supplement fields. Each FileName field type may have different configuration settings and behaviors.

The benefit of embodiments as described may be seen by way of the example discussed below:

If the File Name field originally contained the string "MYtext_Doc", a potential Tokenization might be: mytext doc.

Potential supplementals might be:
my text doc
my text_doc
mytext doc
mytext_doc

This set of data may be added to the Supplement data field, such that it includes: "mytext_doc my text_doc my text doc".

In this particular example, the variation "mytext doc" is not required, since this is a likely outcome from the standard File Name Tokenization process. That is, the tokenized and indexed values for FileName are: "mytext doc".

The search engine may now understand that both the FileName and Supplement fields should be searched as a single logical value to find results. The effect is as if searching within a single field that contains the two fields appended, like this: "mytext doc mytext_doc my text_doc my text doc".

It is noted that this is an example representation. Other embodiments may incorporate special markers or separators to indicate beginning or end of field marks. Another approach may be to use a multi-value implementation of the Supplement field. These methods may be useful for helping to match complete strings, or strings that are anchored. Positional information for each token in the Supplement may also be provided to help the search engine determine proximity and ordering of terms.

Arranging the terms in the Supplement left to right can also simplify evaluation at search time, in particular where complete strings are required. This would arrange the example above along these lines:
"my mytext mytext_doc text text_doc doc"

In this example, conversion from upper to lower case may be performed to reduce the number of permutations and improve findability, although this is not a requirement.

As the values of strings increase in length, the number of possible permutations of a terms can become large. Not all permutations are necessary. In some implementations, the objective of a search system is to find the likely matches, not every single possible match. For example, if the value in the File Name field provided is
"AAb_c\d % 20MyHome12".

Then, an implementation may construct a Supplement that contains:
"aab_c\d aa aab aab_c b b_c c c\d d my myhome myhome12 home home12 12".

Again, not every possible sequence of terms is necessary, since the solution can provide significant value by increasing the probability of success even if not every possible scenario is covered. There is sufficient information that searches for the majority of combinations will succeed. For example, assuming logical "AND" operators between keywords, the following searches would all succeed:
AAb_c
AAb c\d
AAb MyHome
AA b my home Contrast this to a traditional Tokenization approach, where the tokenization might generate the following index terms:

"aab c d myhome"

Clearly, the number of search queries that would succeed in the tokenization case is limited. Of the four examples above, not all are likely to succeed based solely on tokenization.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A method, comprising:
    receiving, by an indexing engine executing on a processor, an indexing request to index an object containing a name value for the object;
    creating, by the indexing engine from the name value for the object, tokens of the name value for the object by applying a first set of string parsing rules to the name value for the object;
    creating, by the indexing engine from the name value for the object, supplementary terms, the creating supplementary terms including applying a second set of string parsing rules to the name value for the object to generate the supplementary terms, including variations of the name value and including partial repetition and overlapping data subsets of the name value, wherein creating supplementary terms further comprises:
        identifying sets of characters from the name value for the object, wherein the supplementary terms comprise variations of the sets of characters, and wherein the second set of string parsing rules include a repetition rule, wherein the applying the second set of string parsing rules further comprises applying the repetition rule to the sets of characters, and wherein the supplementary terms include a partial repetition of a first set of the sets of characters;
storing the tokens in a first index;
storing the supplementary terms in a supplemental index; and
storing the object in a repository, wherein, responsive to a user search query containing input data terms, the object in the repository is searchable through the tokens in the first index and also searchable through variations of the name value for the object through the supplementary terms in the supplemental index against the input data items in the user search query.

2. The method according to claim 1, wherein the name value is received with an indexing instruction from an object analyzer or a document management system operating in an enterprise computing environment.

3. The method according to claim 1, wherein the second set of string parsing rules comprise a splitting rule for splitting a string of characters in the name value for the object based on first letter capitalization, based on a switch from consecutive capital characters to a lower case character, based on a switch from consecutive lower case characters to a capital character, based on a separator, based on a transition from a numerical number to a letter, based on a transition from a letter to a numerical number, based on a grammar criterion, or based on a transition between different language character sets.

4. The method according to claim 1, wherein the second set of string parsing rules comprise a decoding rule for decoding or converting encoded characters in the name value for the object, for removing null or encoded characters in the name value for the object, for converting or generalizing special characters in the name value for the object, for creating an alternative of a word in the name value for the object, or for converting a character pattern in the name value for the object into a normalized value.

5. The method according to claim 4, wherein the character pattern comprises a currency value or a date value in the name value for the object or wherein the character pattern in the name value for the object matches a predetermined character pattern.

6. A system, comprising:
a processor;
a non-transitory computer-readable medium; and
stored instructions translatable by the processor for:
receiving an indexing request to index an object containing a name value for the object;
creating, from the name value for the object, tokens of the name value for the object by applying a first set of string parsing rules to the name value for the object;
creating, from the name value for the object, supplementary terms, the creating supplementary terms including applying a second set of string parsing rules to the name value for the object to generate the supplementary terms, including variations of the name value and including partial repetition and overlapping data subsets of the name value, wherein creating supplementary terms further comprises:
identifying sets of characters from the name value for the object, wherein the supplementary terms comprise variations of the sets of characters, and wherein the second set of string parsing rules include a repetition rule, wherein the applying the second set of string parsing rules further comprises applying the repetition rule to the sets of characters, and wherein the supplementary terms include a partial repetition of a first set of the sets of characters;
storing the tokens in a first index;
storing the supplementary terms in a supplemental index; and
storing the object in a repository, wherein, responsive to a user search query containing input data terms, the object in the repository is searchable through the tokens in the first index and also searchable through variations of the name value for the object through the supplementary terms in the supplemental index against the input data items in the user search query.

7. The system of claim 6, wherein the name value is received with an indexing instruction from an object analyzer or a document management system operating in an enterprise computing environment.

8. The system of claim 6, wherein the second set of string parsing rules comprise a splitting rule for splitting a string of characters in the name value for the object based on first letter capitalization, based on a switch from consecutive capital characters to a lower case character, based on a switch from consecutive lower case characters to a capital character, based on a separator, based on a transition from a numerical number to a letter, based on a transition from a letter to a numerical number, based on a grammar criterion, or based on a transition between different language character sets.

9. The system of claim 6, wherein the second set of string parsing rules comprise a decoding rule for decoding or converting encoded characters in the name value for the object, for removing null or encoded characters in the name value for the object, for converting or generalizing special characters in the name value for the object, for creating an alternative of a word in the name value for the object, or for converting a character pattern in the name value for the object into a normalized value.

10. The system of claim 9, wherein the character pattern comprises a currency value or a date value in the name value for the object or wherein the character pattern in the name value for the object matches a predetermined character pattern.

11. A computer program product comprising a non-transitory computer-readable medium storing instructions translatable by a processor for:
receiving an indexing request to index an object containing a name value for the object;
creating, from the name value for the object, tokens of the name value for the object by applying a first set of string parsing rules to the name value for the object;
creating, from the name value for the object, supplementary terms, the creating supplementary terms including applying a second set of string parsing rules to the name value for the object to generate the supplementary terms, including variations of the name value and including partial repetition and overlapping data subsets of the name value, wherein creating supplementary terms further comprises:
identifying sets of characters from the name value for the object, wherein the supplementary terms comprise variations of the sets of characters, and wherein the second set of string parsing rules include a repetition rule, wherein the applying the second set of string parsing rules further comprises applying the repetition rule to the sets of characters, and wherein the supplementary terms include a partial repetition of a first set of the sets of characters;

storing the tokens in a first index;

storing the supplementary terms in a supplemental index; and storing the object in a repository, wherein, responsive to a user search query containing input data terms, the object in the repository is searchable through the tokens in the first index and also searchable through variations of the name value for the object through the supplementary terms in the supplemental index against the input data items in the user search query.

12. The computer program product of claim 11, wherein the second set of string parsing rules comprise a splitting rule for splitting a string of characters in the name value for the object based on first letter capitalization, based on a switch from consecutive capital characters to a lower case character, based on a switch from consecutive lower case characters to a capital character, based on a separator, based on a transition from a numerical number to a letter, based on a transition from a letter to a numerical number, based on a grammar criterion, or based on a transition between different language character sets.

13. The computer program product of claim 11, wherein the second set of string parsing rules comprise decoding a rule for decoding or converting encoded characters in the name value for the object, for removing null or encoded characters in the name value for the object, for converting or generalizing special characters in the name value for the object, for creating an alternative of a word in the name value for the object, or for converting a character pattern in the name value for the object into a normalized value.

14. The computer program product of claim 13, wherein the character pattern comprises a currency value or a date value in the name value for the object or wherein the character pattern in the name value for the object matches a predetermined character pattern.

15. The computer program product of claim 11, wherein the name value is received with an indexing instruction from an object analyzer or a document management system operating in an enterprise computing environment.

* * * * *